(12) United States Patent
Frederiksen et al.

(10) Patent No.: US 11,402,474 B2
(45) Date of Patent: Aug. 2, 2022

(54) COMPENSATION DEVICE FOR A BIAXIAL LIDAR SYSTEM

(71) Applicant: Robert Bosch GmbH, Stuttgart (DE)

(72) Inventors: Annette Frederiksen, Renningen (DE); Stefanie Hartmann, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 16/449,971

(22) Filed: Jun. 24, 2019

(65) Prior Publication Data
US 2019/0391241 A1 Dec. 26, 2019

(30) Foreign Application Priority Data
Jun. 25, 2018 (DE) .......................... 102018210291.0

(51) Int. Cl.
| | |
|---|---|
| *G01S 7/48* | (2006.01) |
| *G01S 7/481* | (2006.01) |
| *G02B 5/32* | (2006.01) |
| *G01S 17/50* | (2006.01) |
| *G01S 17/08* | (2006.01) |

(52) U.S. Cl.
CPC ........... *G01S 7/4816* (2013.01); *G01S 7/4811* (2013.01); *G02B 5/32* (2013.01); *G01S 17/08* (2013.01); *G01S 17/50* (2013.01)

(58) Field of Classification Search
None
See application file for complete search history.

(56) References Cited

U.S. PATENT DOCUMENTS

| | | | |
|---|---|---|---|
| 5,714,750 A | 2/1998 | Eastman et al. | |
| 2008/0266544 A1 | 10/2008 | Wolf et al. | |
| 2013/0208256 A1 | 8/2013 | Mamidipudi et al. | |
| 2013/0342657 A1* | 12/2013 | Robertson | H04N 13/239 348/47 |
| 2015/0362651 A1* | 12/2015 | Voloschenko | G02B 23/26 359/9 |

FOREIGN PATENT DOCUMENTS

| | | |
|---|---|---|
| DE | 4316348 A1 | 11/1994 |
| WO | 2016116733 A1 | 7/2016 |

* cited by examiner

*Primary Examiner* — Hovhannes Baghdasaryan
(74) *Attorney, Agent, or Firm* — Norton Rose Fulbright US LLP; Gerard Messina

(57) ABSTRACT

A compensation device for a biaxial LIDAR system includes two holographic optical elements, which are locatable between a receiving optical system and a detector element, and which are designed to compensate for a parallax effect of the biaxial LIDAR system, incident light being guidable onto the detector element with the aid of the two holographic optical elements.

8 Claims, 9 Drawing Sheets

Related Art

Related Art

COMPENSATION DEVICE FOR A BIAXIAL LIDAR SYSTEM

FIELD OF THE INVENTION

The present invention relates to a compensation device for a biaxial LIDAR system. The present invention further relates to a method for manufacturing a compensation device for a biaxial LIDAR system.

BACKGROUND INFORMATION

Coaxial and biaxial LIDAR sensors are known. In coaxial sensors, the transmission path and the receiving path are located on one axis, the beams between transmitter and detector being split in this case, for example, via a beam splitter. These systems are negatively affected by the loss at the beam splitter and the scattered light in the system. Scanning or rotating biaxial LIDAR sensors utilize different light paths for the transmission path and the receiving path.

This is depicted in principle in FIG. 1, which shows a highly simplified representation of a conventional rotating biaxial LIDAR system 100. A laser 1 is apparent, which sends its radiation to and through transmission optical system 2. This results in an emitted laser beam S having minimal divergence in the horizontal. In the receiving path, a schematically depicted receiving optical system 3 is apparent, which directs received radiation to a detector element 4. The entire arrangement is rotatable about a rotation axis 5 and is protected by a protective device 10 (for example, a cover glass).

In contrast to conventional optical systems, the beam deflection in the case of holographic optical elements, which are implemented as volume holograms, is not predefined by refraction, but rather by diffraction at the volume grating. The aforementioned holographic optical elements may be manufactured both in transmission as well as in reflection and with the free choice of angle of incidence, angle of reflection or diffraction angle, they allow for new designs. The holographic diffraction grating in this case is exposed in a thin film.

As a result of the volume diffraction, the holographic optical elements may also be assigned a characteristic wavelength selectivity and angle selectivity or also a filter function. Only light from defined directions and having defined wavelengths is diffracted on the structure as a function of the absorption condition (defined by wavelength and angle). In this case, the holographic material applied to a film is distinguished, in particular, by its transparency. Light is diffracted only from particular directions and wavelengths on the structure, the hologram remaining transparent to light from all other directions.

Biaxial LIDAR systems have the so-called parallax effect, which is schematically depicted in FIG. 2. Light emitted by transmission optical system 2 is imaged on different areas of detector element 4 as a function of the distance of the object. This phenomenon is depicted for a nearby object 20 and for a distant object 30 in FIG. 2. Here, the light is emitted, for example, at the angle 0°, and if it were to involve a coaxial system, this would also return again on the axis on the receiving side. As a result of base distance b of the biaxial LIDAR system, the return beams of the two exemplary objects 20, 30 strike detector element 4 in areas p1 and p2, as a result of which detector element 4 is correspondingly larger to still enable these beams to be imaged.

The impact of the parallax effect on the size of the detector is shown in FIG. 3 for an exemplary system having a focal length of 25 mm and a base distance b of 30 mm. A position p on detector element 4 is apparent as a function of a distance d of the object.

US 20130208256 A1 describes a LIDAR system having light-diffracting elements, such as holographic optical elements. Various properties of these elements are specifically utilized, also in a combination with optical waveguides.

WO 2016 116733 A1 describes a LIDAR system, including optical waveguides, which are coupled to a detector and which may be combined with holographic optical elements.

SUMMARY

An object of the present invention is to ensure an improved biaxial LIDAR system.

According to a first aspect, the present invention provides a compensation device for a biaxial LIDAR system, including:
  at least two holographic optical elements, which are locatable between a receiving optical system and a detector element of the biaxial LIDAR system, and which are designed to compensate for a parallax effect of the biaxial LIDAR system, incident light being guidable onto the detector element with the aid of the two holographic optical elements.

With the aid of the compensation device, it is possible to compensate for a parallax error, which occurs as a result of the transmission path and receiving path not being situated centrally on the rotation axis. In this way, it is possible to advantageously minimize or at least reduce expensive detector surfaces for the biaxial LIDAR system. A high degree of design freedom is useful for the design of the compensation device due to the high diffraction efficiency of volume holograms.

The object is achieved according to a second aspect by a method for manufacturing a compensation device for a biaxial LIDAR system, including the step:
  providing at least two holographic optical elements, the holographic optical elements being designed in such a way that they compensate for a parallax effect of the biaxial LIDAR system, incident light being guidable onto the detector element of the biaxial LIDAR system with the aid of the two holographic optical elements.

One advantageous refinement of the compensation device is distinguished by the fact that the holographic optical elements are designed as reflection holograms. In this way, a high diffraction efficiency having defined diffraction properties may be utilized for the volume holograms designed in reflection.

Another advantageous refinement of the compensation device is distinguished by the fact that the holographic optical elements are designed as planar reflection holograms.

Another advantageous refinement of the compensation device is distinguished by the fact that the holographic optical elements are designed as curved reflection holograms. A high degree of design freedom regarding a geometric arrangement of the holographic optical elements is thereby advantageously supported.

Another advantageous refinement of the compensation device is distinguished by the fact that a first holographic element is designed as a coupling hologram, that a second holographic optical element is designed as a decoupling hologram, an optical waveguide being designed between both holographic optical elements. A high degree of design freedom in terms of the beam guidance within the biaxial LIDAR system is thereby supported.

Another advantageous refinement of the compensation device is distinguished by the fact that a diffraction efficiency of the holographic elements is adjusted in a defined manner. In this way, a beam guidance within the optical wave guide may be advantageously adjusted with the aid of the diffraction efficiency. The result of this supports the fact that an exposure time or a saturation effect for the detector element may be reduced.

Another advantageous refinement of the compensation device is characterized in that the holographic optical elements have a defined optical function for compensating for imaging errors. In this way, optical imaging errors such as, for example, a Petzval curvature (field of curvature) may be compensated for. An improved imaging quality of the scanning biaxial LIDAR system is thereby advantageously supported.

The present invention is described in detail below, including additional features and advantages with reference to multiple figures. Here, identical or identically functioning components have identical reference numerals. The figures are intended, in particular, to clarify the principles of the present invention and are not necessarily executed true to scale. For the sake of better clarity, it may be provided that not all reference numerals are plotted in all figures.

Disclosed device features result analogously from corresponding disclosed method features and vice versa. This means, in particular, that features, technical advantages and embodiments relating to the compensation device for the biaxial LIDAR system result analogously from corresponding embodiments, features and advantages of the method for manufacturing a compensation device for a biaxial LIDAR system, and vice versa.

DETAILED DESCRIPTION

Figure 1:
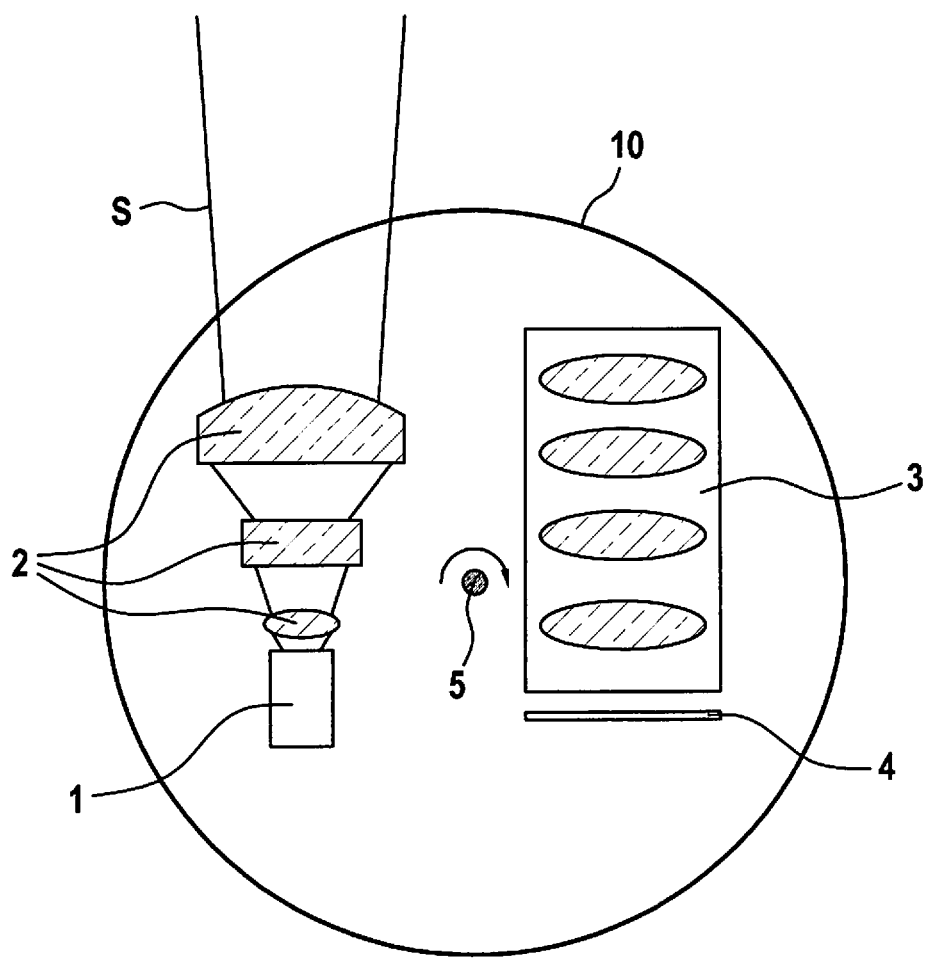
FIG. 1 schematically shows a representation of a conventional biaxial LIDAR system.
Figure 2:
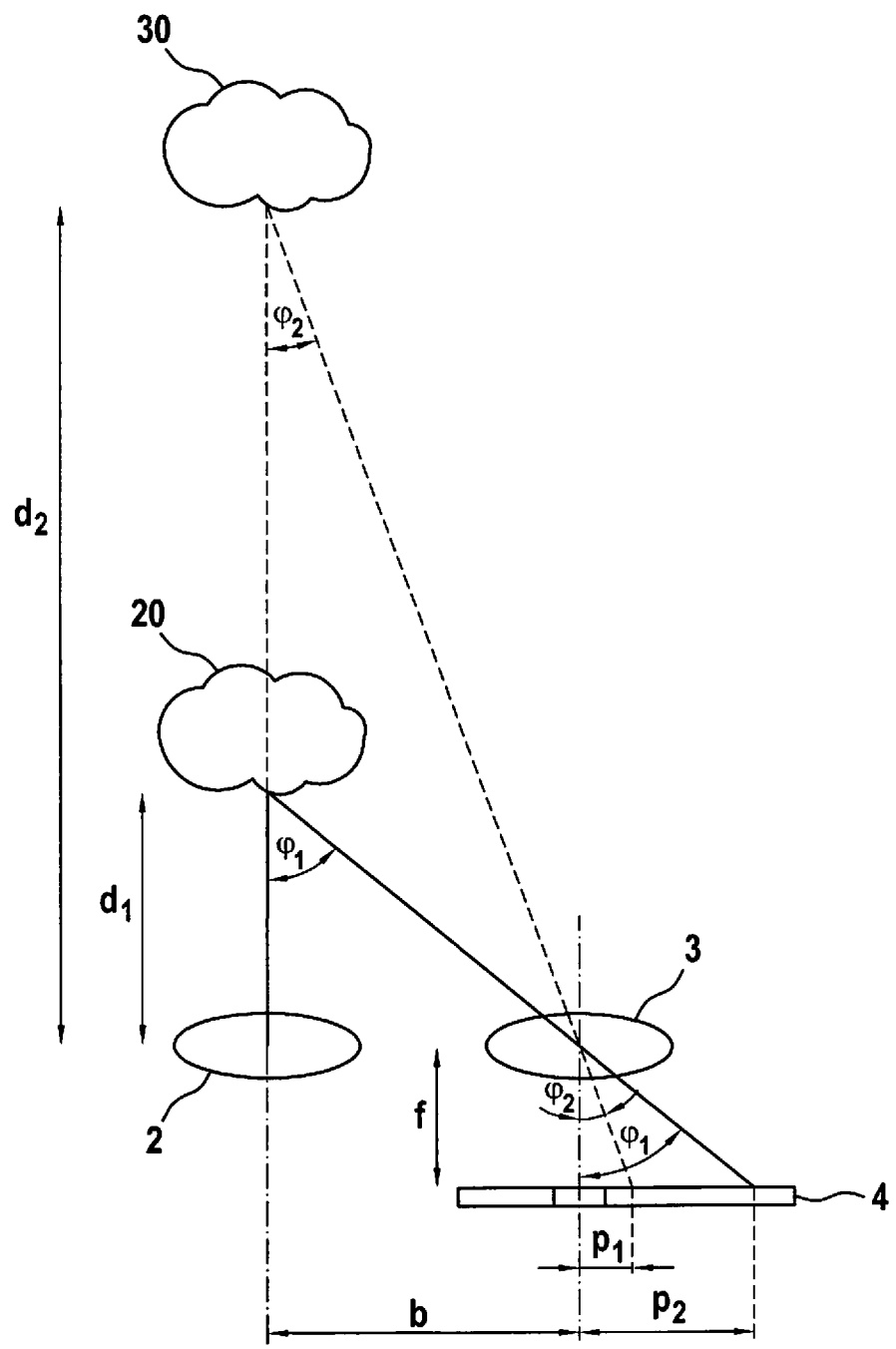
FIG. 2 schematically shows a representation of a parallax problem of a biaxial LIDAR system.
Figure 3:
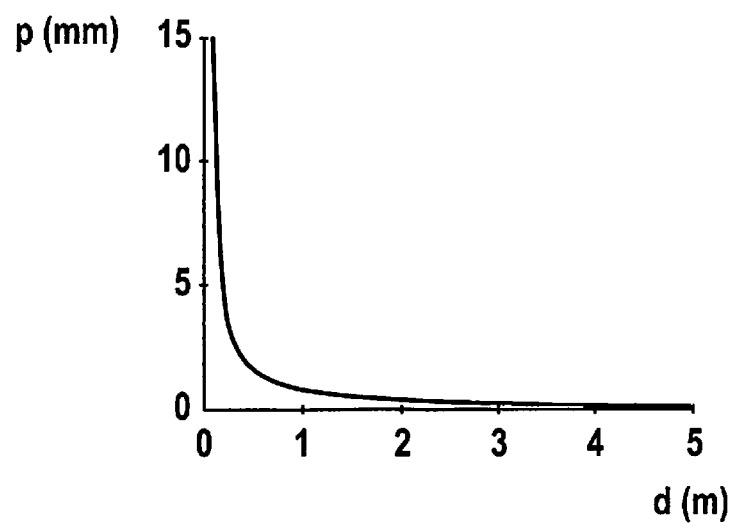
FIG. 3 schematically shows a correlation between parallax effect and detector size.
Figure 4:
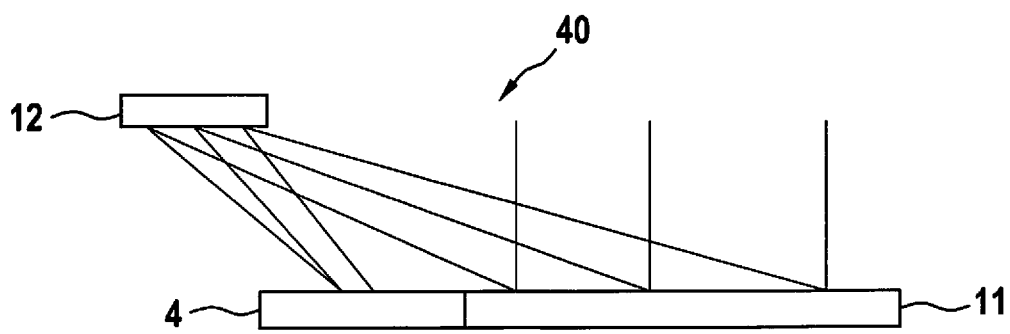
FIGS. 4 through 7 schematically show representations of a proposed compensation device, including two reflection holograms.

FIG. 4 shows a first specific embodiment of a proposed compensation device 40 for a biaxial LIDAR system. A first holographic optical element 11 is apparent in the form of a reflection hologram, which is struck by beams from distant or nearby objects 20, 30 (not depicted). This first holographic optical element 11 directs the beams to a second holographic optical element 12 in the form of a second reflection hologram, which guides the beams to detector element 4 of the biaxial LIDAR system (not depicted). As a result, detector element 4 need advantageously only be of a size that would be necessary for a coaxial LIDAR system. It may, of course, be designed somewhat larger, so that the parallax effect is distributed in particular proportions to the size of detector element 4 and in particular proportions to holographic optical elements 11, 12.

This advantageously utilizes, in particular, the possibility of specifically adjusting the diffraction efficiency of holographic optical elements 11, 12. It may be meaningful, for example, to select the diffraction efficiency in area p1 (radiation from distant object 30) to be very high, whereas in area p2 (radiation from nearby object 20) a lower diffraction efficiency may be selected. In the case of nearby objects 20, a significantly higher percentage of the emitted output returns, so that the lower diffraction efficiency is able to protect detector element 4 from saturation.

Since LIDAR systems are operated at a fixed wavelength (for example, at 905 nm), the use of holographic optical elements in the form of holographic optical elements 11, 12 is particularly advantageous in this case, since they are likewise designed for a particular wavelength and function optimally for this wavelength, whereas other wavelengths are not influenced by the holographic function. In this way, it is possible through the use of the holographic optical elements 11, 12 in the form of reflection holograms to advantageously also realize an intrinsic filter effect.

The reflection holograms are preferably analogously recorded, but may also be written pixel by pixel by a holographic printer. This offers the possibility of printing specific holograms with an optical function that varies pixel by pixel. The contact copy method may then be used for mass production.

Figure 5:
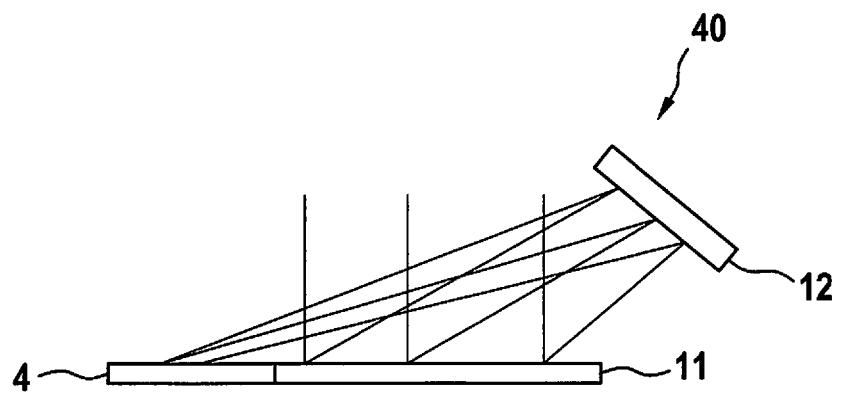
Figure 6:
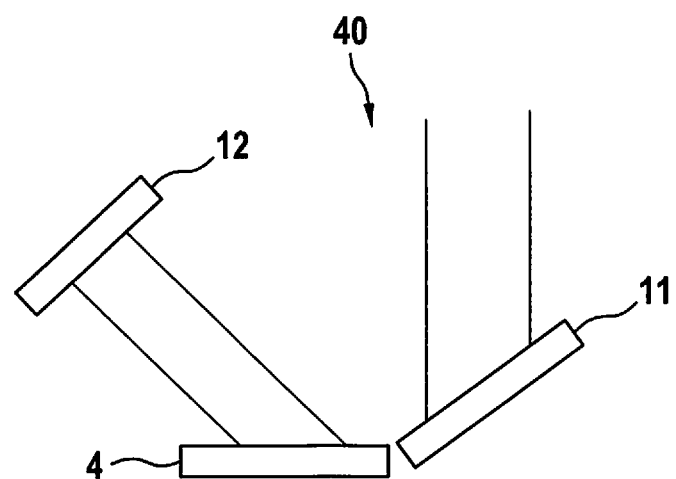
Figure 7:
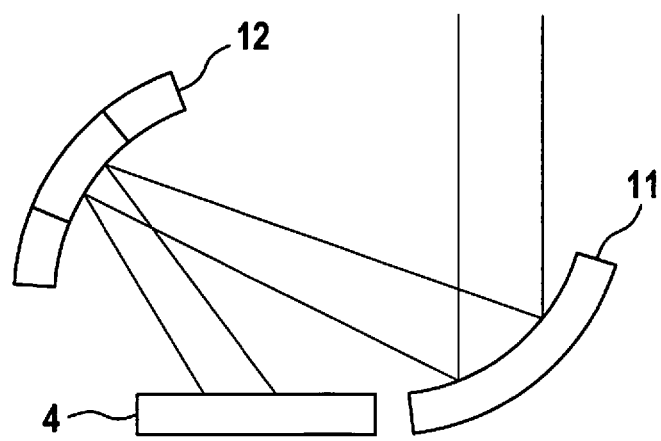

FIG. 5 shows another specific embodiment of proposed compensation device 40, in this case, it being apparent that holographic optical elements 11, 12 are situated on the same side of detector element 4. Arbitrary geometrical arrangements are, in principle, conceivable here. Diagonally positioned and curved holographic optical elements 11, 12 are also possible for implementing compensation device 40, as depicted, in principle, in FIGS. 6, 7.

Holographic optical elements 11, 12 in the form of reflection holograms are designed preferably together with receiving optical system 3. In this design, it is then also possible to implement a part of the image quality via holographic optical elements 11, 12, and thus to design the lens system of receiving optical system 3 more compactly and/or more cost-efficiently and/or more simply. At a greater angle, it is difficult to achieve the required image quality using a lens system that includes few lenses. However, two holographic optical elements 11, 12 in the form of reflection holograms are present specifically in this angle range, which are able to assume optical functions.

Figure 8:
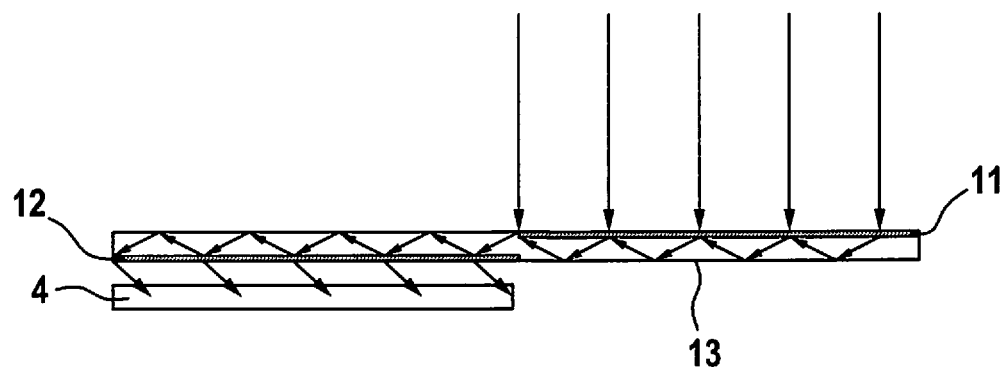
FIG. 8 schematically shows a representation of a compensation device, including an optical waveguide.

Another advantageous specific embodiment of proposed compensation device 40 provides a beam guidance with the aid of an optical waveguide 13. In this embodiment, the signal is coupled via a first holographic element 11 in the form of a coupling hologram into optical waveguide 13, which causes a deflection in the angle of the total reflection and is diffracted out again from the structure at a defined angle via an optical holographic element 12 in the form of a decoupling hologram. This is depicted, in principle, in FIG. 8.

Figure 9:
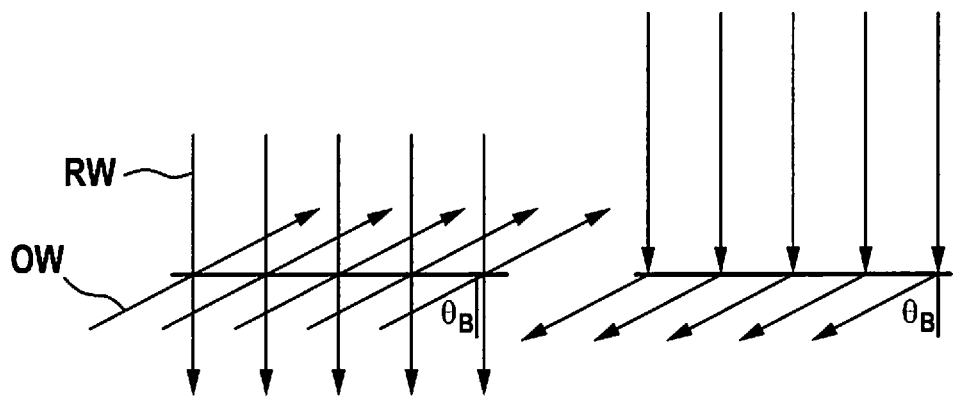
FIG. 9 schematically shows a representation of a creation of a coupling hologram of FIG. 8.

A basic representation of a recording of the coupling hologram is depicted in FIG. 9. In the process, an interference pattern, which is stored in a light-sensitive material (for example, photopolymer), is generated by the superposition of two coherent waves (object wave OW, reference wave RW. During the reconstruction, light is diffracted on the structure and, with the wavelength remaining the same, $$\lambda_{recording} = \lambda_{reconstruction} = \lambda_{LIDAR\ system}$$

$\lambda_{recording}$ . . . recording wavelength
$\lambda_{reconstruction}$ . . . reconstruction wavelength
$\lambda_{LIDAR}$ system . . . system wavelength
is directed again at the diffraction angle of the original object wave OW.

Figure 10:
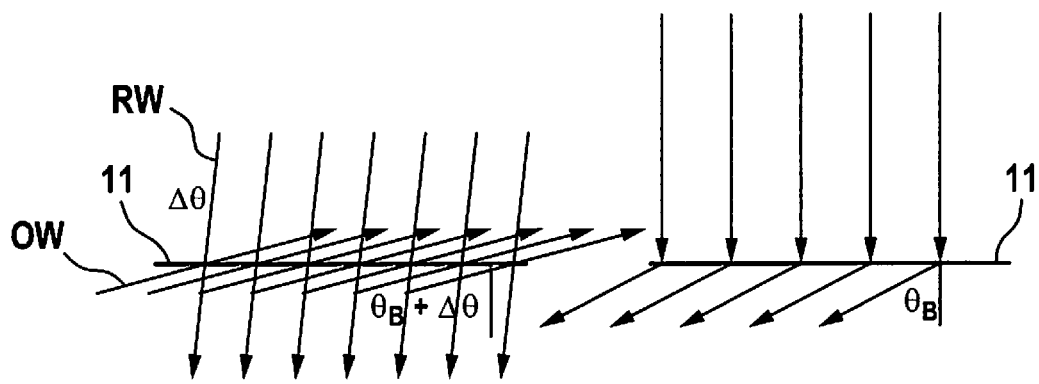
FIG. 10 schematically shows a representation of an alternative creation of the coupling hologram of FIG. 8.

Laser diodes having a high coherence length (not cost-efficient and not space-saving) are necessary for recording holographic optical elements 11, 12, "normal" (cost-efficient and space-saving) laser diodes being sufficient for the reproduction. Given the fact that the wavelengths of the laser diodes having a high coherence length and the wavelengths of the normal diodes are different, the holographic material with its dyes is selective only in certain ranges. Thus, the later system wavelength $\lambda_{LIDAR\ system}$ often does not correspond to the recording wavelength $\lambda_{recording}$. This difference in the wavelength during the recording and the reconstruction may be pre-compensated for during the recording by an angle allowance $\Delta\theta$, which is depicted, in principle, in FIG. 10. One measure of the pre-compensation in this case is described by the Bragg's equation:

$$\lambda = 2d \times \sin\theta$$

d describing the grating distance of the holographic grating, which remains constant after the recording and storing of the volume hologram.

Figure 11:
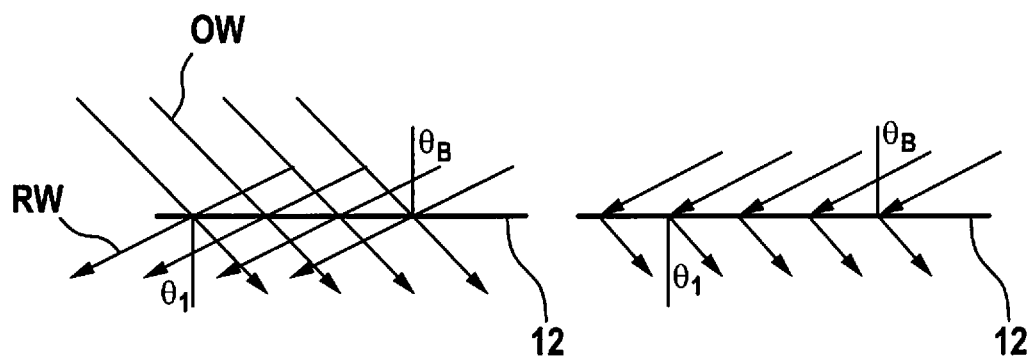
FIG. 11 schematically shows a representation of a creation of a decoupling hologram of FIG. 8.

The recording and reconstruction of the decoupling hologram is depicted in FIG. 11. Here, too, the wavelength difference between recording wave and reconstruction wave may be compensated for by a pre-compensation $\Delta\theta$ during recording of the hologram. The angle of the reference wave in this case corresponds to the diffraction angle $\theta_B$ of the coupling hologram. Decoupling hologram $\theta_1$ may theoretically be freely selected. In the exemplary embodiment depicted, it should be noted that the useful light or the direct signal is not diffracted on the holograph structure.

Figure 12:
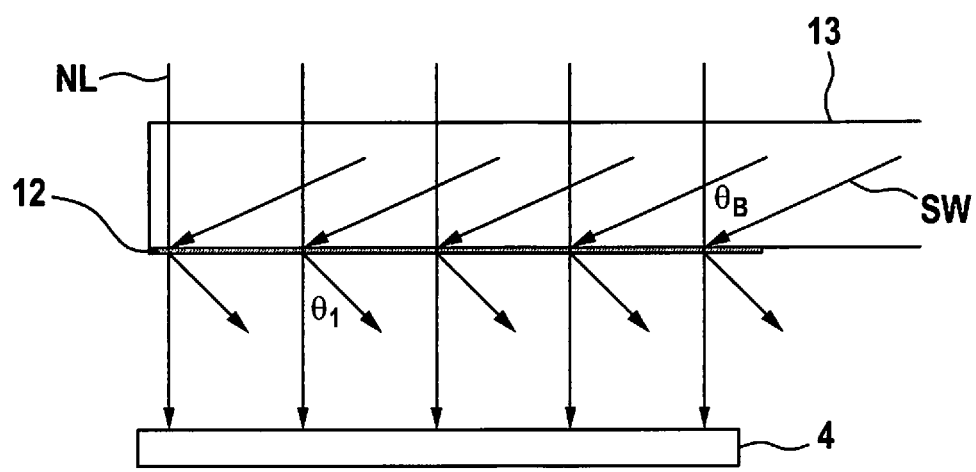
FIG. 12 schematically shows a design of a decoupling hologram for separating direct incident radiation from diffracted radiation.

This is depicted in principle in FIG. 12, which shows a design of an optical holographic element 12 in the form of a decoupling hologram for separating the direct signal and the parallax-compensated signal. A useful light/direct signal NL emitted from above by a distant object 30 is apparent, which passes through optical waveguide 13 and directly strikes detector element 4. Also noticeable is the signal wave SW guided within optical waveguide 13, which is diffracted on holographic optical element 12 in the form of the decoupling hologram and is subsequently guided to detector element 4.

As a result of the characteristic angle selectivity and wavelength selectivity of the volume hologram, it is possible to narrow the optical function to a certain angle range via the selection of the material parameters.

All exemplary images of compensation device 40 are depicted in figures for telecentric lenses, however, the holographic optical elements may also be adapted to non-telecentric imaging systems (not depicted in the figures).

Figure 13:
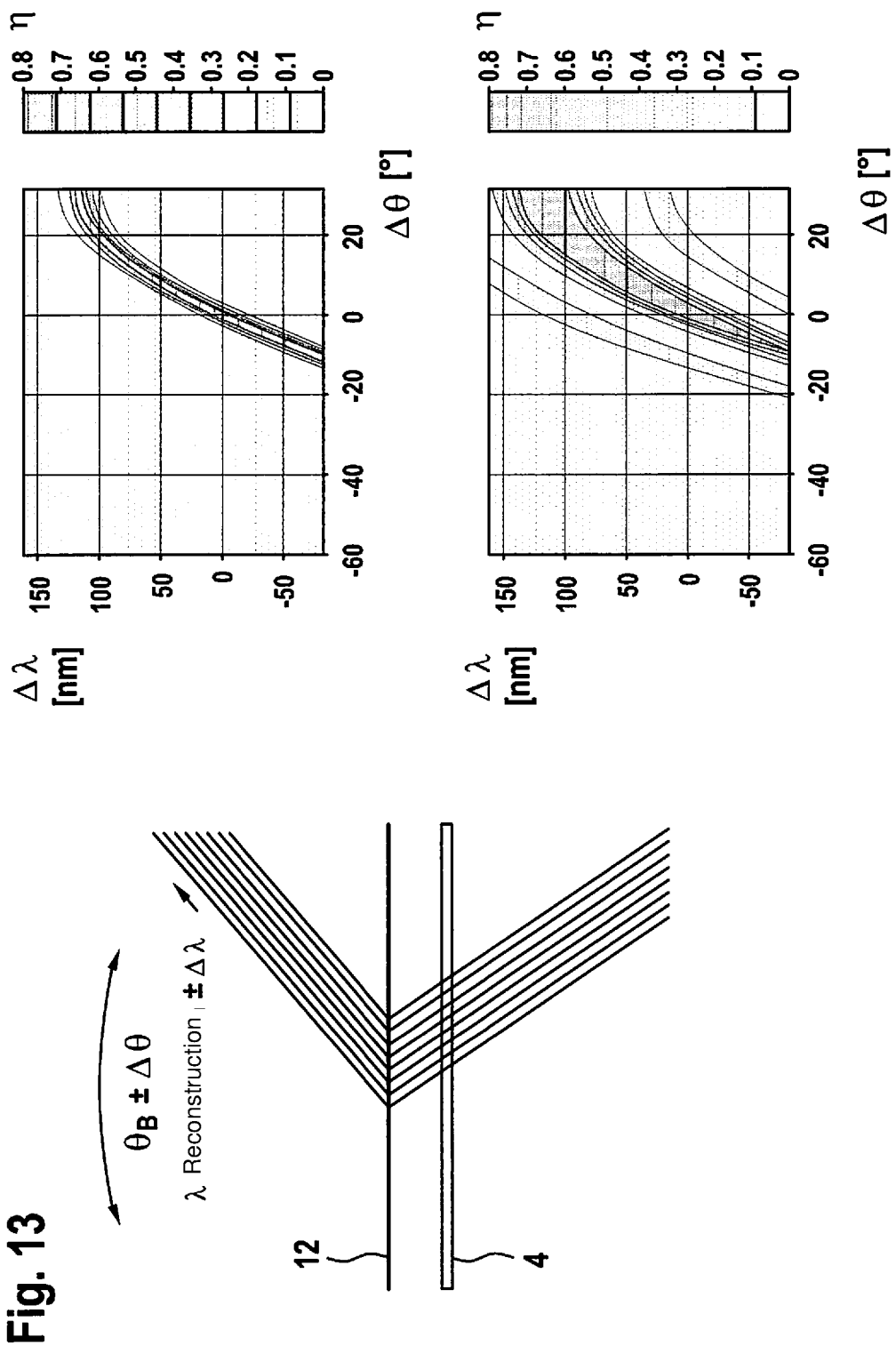
FIG. 13 shows a basic representation of a diffraction efficiency in various materials and wavelengths.

The simulation of a defined structure is depicted in FIG. 13. In this case, the angle of incidence and the wavelength have been varied and the diffraction characteristic for different material parameters (thickness of the holographic layer and refractive index modulation) of two materials has been evaluated via the calculated intensity of the diffracted beam. No light is diffracted on the structure within the useful light range (angle of incidence −20° . . . −40°) defined by the wavelength and angle in the example depicted. Different refractive indices η for the two different materials are graphically depicted.

In addition, a filter function is also produced as a result of the specific cascade-like arrangement of the holographic optical waveguide 13. Only light within a defined wavelength band is diffracted on the coupling structure and then also arrives under the right combination of wavelength and angle at the decoupling hologram.

Figure 14:
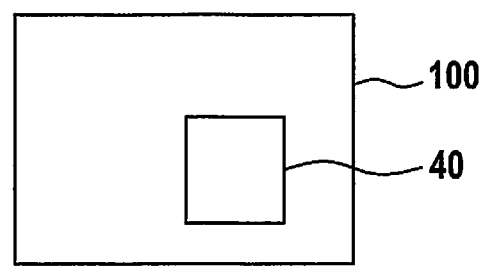
FIG. 14 shows a block diagram of a biaxial LIDAR system, including the proposed compensation device.

FIG. 14 symbolically shows a biaxial LIDAR system 100, including one specific embodiment of proposed compensation device 40.

Figure 15:
FIG. 15 shows a basic representation of the sequence of one specific embodiment of a method for manufacturing a compensation device for a biaxial LIDAR system.

FIG. 15 shows a basic sequence of one specific embodiment of the proposed method for manufacturing a compensation device 40 for a biaxial LIDAR system 100.

At least two holographic optical elements 11, 12 are provided in a step 200, holographical optical elements 11, 12 being designed in such a way that they compensate for a parallax effect of biaxial LIDAR system 100, incident light being guidable with the aid of the two holographic optical elements 11, 12, to a detector element 4 of biaxial LIDAR system 100.

Using the compensation device, an improved biaxial scanning LIDAR system may be implemented as a result, which is distinguished, in particular, by the fact that the detector element is minimized in terms of surface area and, as a result, is cost-efficiently implementable.

In summary, a compensation device for a biaxial, scanning LIDAR system is provided with the present invention. A biaxial LIDAR system implemented with the proposed compensation device may be used preferably in the motor vehicle sector for the distance measurement and speed measurement of objects.

Those skilled in the art recognize that a multitude of modifications of the present invention are possible without departing from the core of the present invention.

What is claimed is:

1. A compensation device for a biaxial LIDAR system, comprising:
    at least two holographic optical elements that are locatable between a receiving optical system and a detector element of the biaxial LIDAR system;
    wherein the at least two holographic optical elements compensate for a parallax effect of the biaxial LIDAR system, and wherein an incident light is guidable onto the detector element with the aid of the at least two holographic optical elements, and
    wherein a diffraction efficiency of the at least two holographic optical elements is adjusted in a defined manner.

2. The compensation device as recited in claim 1, wherein the at least two holographic optical elements are reflection holograms.

3. The compensation device as recited in claim 2, wherein the at least two holographic optical elements are planar reflection holograms.

4. The compensation device as recited in claim 2, wherein the at least two holographic optical elements are curved reflection holograms.

5. The compensation device as recited in claim 1, wherein:
- a first holographic optical element of the at least two holographic optical elements is a coupling hologram,
- a second holographic optical element of the at least two holographic optical elements is a decoupling hologram, and
- an optical waveguide is disposed between the at least two holographic optical elements.

6. The compensation device as recited in claim 1, wherein the at least two holographic optical elements include a defined optical function for compensating for an imaging error.

7. A biaxial LIDAR system, comprising:
- a compensation device that includes at least two holographic optical elements that are locatable between a receiving optical system and a detector element of the biaxial LIDAR system;
- wherein the at least two holographic optical elements compensate for a parallax effect of the biaxial LIDAR system, and wherein an incident light is guidable onto the detector element with the aid of the at least two holographic optical elements, and
- wherein a diffraction efficiency of the at least two holographic optical elements is adjusted in a defined manner.

8. A method for manufacturing a compensation device for a biaxial LIDAR system, comprising:
- providing at least two holographic optical elements for compensating for a parallax effect of the biaxial LIDAR system;
- wherein an incident light is guidable onto a detector element of the biaxial LIDAR system with the aid of the at least two holographic optical elements, and
- wherein a diffraction efficiency of the at least two holographic optical elements is adjusted in a defined manner.

* * * * *